(12) United States Patent
Zakikhani

(10) Patent No.: US 6,485,525 B1
(45) Date of Patent: Nov. 26, 2002

(54) FIBROUS SUBSTRATE TREATMENT

(75) Inventor: Mohsen Zakikhani, Birmingham (GB)

(73) Assignee: Rhodia Consumer Specialties Limited, West Midlands (GB)

( * ) Notice: Subject to any disclaimer, the term of this patent is extended or adjusted under 35 U.S.C. 154(b) by 0 days.

(21) Appl. No.: 09/555,537

(22) PCT Filed: Dec. 2, 1998

(86) PCT No.: PCT/GB98/03591

§ 371 (c)(1),
(2), (4) Date: May 31, 2000

(87) PCT Pub. No.: WO99/29957

PCT Pub. Date: Jun. 17, 1999

(30) Foreign Application Priority Data

Dec. 6, 1997 (GB) ................................................ 9725828

(51) Int. Cl.⁷ ..................... D06M 13/244; D06M 15/55; B05D 3/00
(52) U.S. Cl. ...................... 8/127.1; 8/115.62; 8/115.64; 8/584; 8/115.6; 427/386; 427/389.9
(58) Field of Search ............................ 8/115.64, 127.1, 8/115.62, 584, 427

(56) References Cited

U.S. PATENT DOCUMENTS

| 4,585,845 A | 4/1986 | Engelhardt et al. |
| 5,496,476 A | 3/1996 | Tang et al. |

FOREIGN PATENT DOCUMENTS

| DE | 42 31 358 A | 3/1994 |
| EP | 0 780 406 A2 | 6/1997 |
| GB | 1 061 768 | 3/1967 |
| WO | WO 94/01476 | 1/1994 |

Primary Examiner—Margaret Einsmann
(74) Attorney, Agent, or Firm—Frishauf, Holtz, Goodman & Chick, P.C.

(57) ABSTRACT

A method is provided of altering the chemical and/or physical functionality of a fibrous substrate (e.g. fibers, fabrics and fiber-resin composites) by the action of a polymeric composition containing at least one phosphono- or phosphino-component. The polymeric composition may include VPA, VDPA or hypophosphorous acid. The fibres may be cellulosic and/or non-cellulosic, or metal or ceramic. The method can be used, for example, to enhance the receptivity of a fibrous substrate to dyes.

18 Claims, No Drawings

FIBROUS SUBSTRATE TREATMENT

This invention relates to a method of treating a fibrous substrate so as to alter its chemical and/or physical functionality.

The substrate may, for example, comprise fibres or a fabric.

The present invention further relates to the use of the method aforesaid to enhance the receptivity of a fibrous substrate to dyes.

The present invention yet further relates to the use of the aforesaid method to enhance the adhesion, to a fibrous substrate, of other materials.

In a first aspect, the present invention provides a method of treating a fibrous substrate so as to alter its chemical and/or physical functionality, in which the substrate is reacted with an aqueous solution of a polymer comprising at least one phosphono-component or at least one phosphono-component selected from the group consisting of:

(a) monomeric or homopolymeric vinylidene-1,1 diphosphonic acid (VDPA);

(b) homopolymeric vinylphosphonic acid (VPA);

(c) a copolymer of VPA or VDPA with an unsaturated sulphonic acid, an unsaturated carboxylic acid, an unsaturated amide, a primary or secondary amine or a polyalkylene imine;

(d) a terpolymer of VPA or VDPA with two components selected from unsaturated sulphonic acids, unsaturated carboxylic acids, unsaturated amides, primary or secondary amines and polyalkylene imines;

(e) the reaction product of VDPA and a primary or secondary amine, a polyalkylene imine or hypophosphorous acid or the salts of said acid; and (f) a phosphono-substituted monocarboxylic or dicarboxylic acid.

For example, the phosphono-component may comprise phosphono-succinic acid.

For example, the polymeric composition may consist essentially of a copolymer of vinylphosphonic acid (VPA) with vinylsulphonic acid (VSA), or with acrylic acid (AA), methacrylic acid (MAA) or acrylamide.

Alternatively, the polymeric composition may consist essentially of a copolymer of VDPA with VSA, or with AA, MAA or acrylamide.

As another example, the polymeric composition may consist essentially of a terpolymer of VDPA, VSA and either AA, MAA or acrylamide.

In a second aspect, the present invention provides the use of a method as hereinabove described to enhance the receptivity of a fibrous substrate to dyes.

Finally, the present invention provides the use of a method as hereinabove described to enhance the adhesion, to a fibrous substrate, of other materials.

Compositions according to the present invention may be applied to fibrous substrates which include cellulosic fibres. The cellulosic fibres are preferably natural cotton, but may be ramie, flax, linen, paper or cardboard or regenerated fibres (e.g. viscose or cuprammonium fibres) or partly etherified or esterified cellulose (e.g. cellulose acetate or propionate).

The substrate may contain both cellulosic and non cellulosic organic fibres, or consist entirely of non cellulosic organic fibres (e.g. 100% polyester fibres) or in some circumstances may consist entirely of cellulosic organic fibres (e.g. 100% cotton fibres).

The non cellulosic fibres are preferably polyester or polyamide, glass or carbon fibres, but may also be acrylic. The fibres may be metal or ceramic fibres. Other suitable non-cellulosic fibres include those of poly (p-phenylene benzo-bisthiazole) and poly (p-penylene benzo-bisoxazole). The polyamide may be an aliphatic one, such as copolymers of a polyamine (such as a diamine) preferably an alkylene diamine, e.g of 4–12 carbon atoms and a polycarboxylic acid, e.g. a dicarboxylic acid, of 4–14 carbon atoms, such as an alkylene dicarboxylic acid (e.g NYLON* 66), or polylactams (such as NYLON* 6). Alternatively, the polyamide may be an aromatic one, such as an aramid based on aromatic dicarboxylic acids and phenylene diamines. The substrate can contain at least 20% of cellulosic fibres and up to 80% of coblendable fibres e.g. 10–80% especially 25–80% of coblendable fibres (such as polyamides). However, the substrate preferably comprises cellulosic fibres and polyester fibres. The substrate usually contains up to 80% (e.g. up to 70%) polyester fibres and the remainder cellulosic fibres.

Substrates comprising at least 45% non cellulosic fibres such as polyester fibres, e.g. 45–100% polyester, are preferred, as are substrates comprising 30–78% cellulosic fibres and 22–70% polyester fibres, or 30–62% cellulosic fibres and 38–70% polyester fibres. The polyester is usually a condensation product containing structural units from an aliphatic alcohol, e.g. a dihydric alcohol, especially ethylene glycol or butane diol (or mixtures thereof) and an aromatic dicarboxylic acid, e.g. terephthalic acid, or a mixture thereof with other dicarboxylic acids, such as isophthalic acid, or sebacic acid.

The substrate fibres may be in the form of thread or non woven fabrics, but are preferably used in the form of woven fabrics. Mixtures of fibres (e.g. of cellulosic and other fibres) may be an intimate or non intimate mixture, but the fibres are preferably in the form of blends of cellulosic fibres and other fibres, (e.g. polyester fibres), as in cospun blends such as cotton/polyester or polyester/cotton staple fibre, but may be in the form of core spun yarn with a core of the other fibre, e.g. polyester-sheathed cotton fibres. In a fabric, the warp and weft fibres are preferably the same, but may be different, e.g. one may be made from cotton fibres and the other from, say, polyester/cotton fibres or NOMEX*/cotton. Thus in this specification the term "blend" also includes unions and union/blends as well as core/sheath fibres.

The method according to the present invention may be applied to the dyeing of fibres or fabrics.

The reactive dyeing of a fibre or fabric consisting essentially of cellulose (e.g. cotton, ramie, flax, linen, paper, cardboard) or of regenerated fibres (e.g. viscose or cuprammonium fibres) or of fibres and fabrics of cellulose acetate or cellulose propionate has hitherto required the addition of inorganic salts to the dye bath to enhance the receptivity of the fabric to the dye. Such salts require removal from the spent dye bath at the conclusion of the dyeing process.

The Applicants have found that the treatment of such fibres or fabrics with polymeric compositions according to the method of the present invention avoids the need to use inorganic salts, enhances the take-up of the dye by the fibre or fabric and enables the fibre or fabric to retain more of the dye after washing.

Non-cellulosic fibres or fabrics (e.g. polyester fibres or fabrics) have hitherto had to be dyed by means of disperse dyes. Disperse dyes do not react chemically with the fabric they have to be physically "entrapped" in the fabric by the application of elevated temperature and pressure. Thus, a reactive dye would not be expected to "take" on a polyester fabric.

The Applicants have found that the use of a polymeric composition according to the method of the present invention to treat polyester fibres or fabrics results in the fibre or fabric becoming capable of being dyed by means of a reactive dye.

With regard to the dyeing of fabric blends (e.g. cotton/polyester blended fabrics), this has previously necessitated the use of two dyes : a reactive dye for the cotton and a disperse dye for the polyester.

The Applicants have found that the use of a polymeric composition according to the present invention to treat cotton/polyester blended fabrics results in the fabrics becoming capable of being dyed by means of a single reactive dye.

The use of the polymeric compositions of the present invention is equally applicable to fibres used in composites, wherein the adhesion at the interface between the fibres and the matrix is enhanced by the use of the polymeric compositions.

Such adhesion-enhancement has been evidenced by an increase in the force necessary to debond the fibres from the matrix and confirms interaction of the treated fibres, through the polymeric composition, with the matrix material (e.g. a resin). Suitable variation of the polymeric composition can be used to produce a "tight" or a "loose" composite, depending upon the desired properties of the composite.

The present invention will be illustrated by way of the following Examples.

EXAMPLE 1

Polyester filament (about 18 g) was made by melt-spinning polyester granules (available from Kodak Eastman as 0.78 IV) and placed in a dyeing bomb. 1 litre of a 75 g/l solution of the terpolymer of VPA/AA/VSA (5:4:1) was charged into this bomb. The temperature was raised to 130° C. at a rate of 3° C./min. The temperature of the bomb was maintained at 130° C. for a further one hour. The bomb was then cooled to room temperature and the filament was removed and cured at 180° C. for five minutes in an oven. The sample was then washed in water to remove any unbound polymer and dried.

The filament was then examined by scanning microscopy (SEM) and energy dispersive X-ray analysis (EDAX). The SEM images showed evidence for the presence of the terpolymer on the polyester, which was then confirmed by phosphorus dot maps of the images. These showed a significant increase in the number of dots (compared to the dot map for an untreated filament). The spectrum obtained by energy dispersive X-ray analysis also showed prominent phosphorus and sulphur peaks which were not present in the spectrum for an untreated filament. In addition, the level of absorbency of the treated filament was checked and showed that the filament had become hydrophilic.

EXAMPLES 2 TO 8

In the following Examples, fabric samples were treated with aqueous solutions of a vinylphosphonic acid-acrylic acid-sodium vinyl sulphonate terpolymer in which the mole ratio of the constituent monomers was 5:4:1 respectively.

EXAMPLE 2

A sample of plain-weave, undyed polyester fabric, 10 cm by 5 cm, was immersed in a solution containing 20% by weight of the VPA:AA:VSANa terpolymer and then hung up to dry. The sample was placed in a fan oven at 225° C. for five minutes. After removal from the oven the sample was immersed in deionized water overnight and then stirred with three fresh aliquots of water to remove any unbound polymer. After this rinsing procedure the sample was dried in an oven at 95° C. Small pieces were cut from the centre of the fabric sample and examined by scanning electron microscopy (SEM) and energy dispersive X-ray analysis (EDAX).

The SEM images (×500 magnification) showed evidence of a coating on the fibre surface and this was confirmed by phosphorus dot maps of the image. These showed a significant increase in the number of dots (compared to the dot map for an untreated fabric sample) such that the arrangement of the fibres was clearly reproduced. The spectrum obtained by energy dispersive X-ray analysis also showed prominent phosphorus and sulphur peaks (which were not present in the spectrum for an untreated fabric sample).

EXAMPLES 3 TO 5

Further samples of the polyester fabric of Example 2 were treated with terpolymer solutions of different concentrations as shown in TABLE I below. The sample treated with 5% terpolymer solution (Example 4) showed an enhanced dot map image and clear P and S peaks in the EDAX spectra. These elements were also detected in the sample treated with 2% terpolymer solution (Example 5).

TABLE I

| Ex. | Terpolymer solution (% w/w) | Cure conditions | Phosphorus dot maps of SEM image | EDAX spectrum |
| --- | --- | --- | --- | --- |
| 3 | 20 | 225° C./5 mins | Strong dot map image showing arrangement of fibres | Strong P and S peaks |
| 4 | 5 | 225° C./5 mins | Increase in dots compared to untreated fabric - shows arrangement of fibres | P and S peaks |
| 5 | 2 | 225° C./5 mins | No significant increase in dots compared to untreated fabric | Weak P and S peaks |

EXAMPLES 6 TO 8

Samples of NOMEX* fabric were dipped in solutions of the VPA:AA:VSANa terpolymer and allowed to dry overnight. They were then put into a fan oven at 220° C. for three minutes. After removal from the oven the samples were immersed in deionized water for an hour and then stirred with three fresh aliquots of water to remove any unbound polymer. After this rinsing procedure the samples were dried in an oven at 95° C. Small pieces were cut from the centre of the fabric samples and analysed as before.

EDAX spectra showed clear P and S peaks for all three samples, indicating that the terpolymer had become fixed to the fibres. A strong dot map image showing the arrangement of fibres was also obtained for the sample treated with 20% terpolymer solution (Example 7). The results are given in TABLE II:

TABLE II

| Ex. | Terpolymer solution (% w/w) | Cure conditions | Phosphorus dot maps of SEM image | EDAX spectrum |
| --- | --- | --- | --- | --- |
| 6 | 20 | 220° C./3 mins | Increase in dot compared to untreated fabric - shows arrangement of fibres | Strong P and S peaks |
| 7 | 5 | 220° C./3 mins | No significant increase in dots compared to untreated | P and S peaks |

TABLE II-continued

| Ex. | Terpolymer solution (% w/w) | Cure conditions | Phosphorus dot maps of SEM image | EDAX spectrum |
|---|---|---|---|---|
| 8 | 2 | 220° C./3 mins | No significant increase in dots compared to untreated fabric | Weak P and S peaks |

EXAMPLES 9–10

More samples were prepared using the fabrics of Examples 3 and 6 respectively. These were then impregnated with a 50 g/l solution of aluminium hydroxide, dried and cured at 180° C. for five minutes.

The EDAX spectra of the fabrics after treatment showed very strong peaks for aluminium, phosphorus and sulphur.

EXAMPLES 11–12

More samples were prepared using the fabrics of Examples 3 and 6 respectively. These were then impregnated with a 1 M solution of potassium hydroxide, dried and cured at 180° C. for five minutes.

The EDAX spectra of the fabrics after treatment showed very strong peaks for potassium, phosphorus and sulphur.

EXAMPLES 13–14

More samples were prepared using the fabrics of Examples 3 and 6 respectively. These were then impregnated with a 0.5 Molar solution of aluminium sulphate and dried and cured at 190° C. for five minutes, rinsed thoroughly with water to remove any unbound material.

The EDAX spectra of the fabrics after treatment showed extremely strong peaks for aluminium phosphorus sulphur.

EXAMPLES 15–16

More samples were prepared using the fabrics of Examples 3 and 6 respectively. Tlhese were then similarly impregnated with a 0.5 Molar solution of aluminium sulphate and dried without any subsequent curing at elevated temperature, rinsed thoroughly with water to remove any unbound material.

The EDAX spectra of the fabrics after treatment showed very strong peaks for aluminium, phosphorus, sulphur.

EXAMPLES 17 TO 18

The following Examples show the dyeing properties of a 100% polyester fabric modified with a polyethylene-imine phosphonate derivative. The derivative was applied to the fabric and the coloration of the resulting modified substrates with appropriate dyestuffs, together with the dyeing properties of a 100% cotton fabric treated with the polyethylene-imine phosphonate derivative, were investigated.

Application of Phosphonate Derivative

In the following Examples, "Polymer ITC973" denotes a polyethylene-imine phosphonate derivative of VDPA, available from Albright & Wilson UK Limited.

The polymer was supplied as a 20% w/w aqueous solution. The polymer was applied to a 100% polyester fabric by diluting to 10% w/w with distilled water and padding the resultant solution on to weighed samples of the fabric to a pick-up of about 80% (i.e. about 8% owf polymer was applied). The fabrics were then dried at 100 C. for 5 minutes, then baked at 180 C. for 5 minutes. The resultant fabrics were then washed thoroughly in hot, soapy water to remove unreacted polymer and allowed to dry.

In the case of the cotton fabric the application process was carried out as described hereinabove, except for the drying, which was carried out at room temperature overnight.

EXAMPLE 17

Reactive Dyeing of ITC973-Modified Polyester

A series of reactive dyes utilising various different reactive chemistries was selected and applied to the modified polyester fabric using the following conditions:

2% owf dyestuff

1% Albegal B

Dye bath buffered to pH 5.5

Entered at 40° C., raised to 100° C. and held for 60 minutes

The dyes selected were:

1. Remazol Brilliant Blue R (DyStar)—sulphatoethylsulphone
2. Lanasol Blue 3G (Ciba)—bromoacrylamido
3. Lanasol Red 2G (Ciba)—bromoacrylamido
4. Procion Red P-4BN (BASF)—monochlorotriazine
5. Procion Red H-E3B (BASF)—bis-monochlorotriazine
6. Sumifix Supra Brilliant Red BSF (Sumitomo) bifunctional (MCT/SES)
7. Sumifix Supra Brilliant Red GF (Sumitomo)—bifunctional (MCT/SES)

On completion of the dyeings, the fabrics were removed from the dye baths, rinsed under warm, running water and dried at room temperature. The exhaust dye baths were analysed using a uv/vis spectrophotometer and the exhaustion calculated as before.

In order to assess the level of fixation of the dyes to the substrate, samples of each dyeing were subjected to a C 06 wash fastness test:

5 g/l detergent 1 g/l sodium perborate 2 g/l sodium carbonate

50:1 liquor ratio

60 C. for 30 minutes

The colour strength (K/S) of each of the dyed samples, the washed samples and also of control fabrics (100% wool fabric dyed identically to the modified polyester) was measured using a DATA COLOR instrument.

EXAMPLE 18

Reactive Dyeing of ITC973-modified Cotton

Three reactive dyes utilising different reactive chemistries were selected and applied to the modified cotton fabric using the following conditions:

2% owf dyestuff

Dye bath buffered to pH 5.5

Entered at 40 C., raised to 100 C. and held for 60 minutes

The dyes selected were:

1. Remazol Brilliant Blue R (DyStar)—sulphatoethylsulphone
2. Procion Red H-E3B (BASF)—bis-monochlorotriazine
3. Sumifix Supra Brilliant Red GF (Sumitomo)—bifunctional (MCT/SES)

On completion of the dyeings, the fabrics were removed from the dye baths, rinsed under warm, running water and dried at room temperature. The exhaust dye baths were analysed using a uv/vis spectrophotometer and the exhaustion calculated as before.

In order to assess the level of fixation of the dyes to the substrate, samples of each dyeing were soaped at the boil for 30 minutes.

The colour strength (K/S) of each of the dyed samples, the soaped samples and also of control fabrics (100% cotton fabric dyed identically to the modified cotton) was measured using a DATACOLOR instrument.

Results

Application of Phosphonate Derivatives

After final drying the fabric samples were weighed and the weight of each sample compared to that of the fabric before the application. Weight gains indicated that approximately 4% polymer had been fixed to the fabric (i.e. about 50% of the applied polymer had reacted with and bonded to the polyester).

Reactive Dyeing of ITC973-Modified Polyester

EXAMPLE 17

The results of the dyeing experiments are given in the following TABLE:

| | COLOUR STRENGTH | |
|---|---|---|
| Dye | 973-Polyester | Washed 973-Polyester |
| 1 | 40 | 32 |
| 2 | 71 | 52 |
| 3 | 91 | 76 |
| 4 | 87 | 63 |
| 5 | 59 | 31 |
| 6 | 66 | 33 |
| 7 | 56 | 40 |

The results obtained from measuring the exhaust dye baths and comparing the colour strength of the washed polyester samples with the unwashed samples gives the following uptake figures:

| DYE | % EXHAUSTION | % FIXATION |
|---|---|---|
| 1 | 82 | 80 |
| 2 | 83 | 73 |
| 3 | 99 | 83 |
| 4 | 94 | 72 |
| 5 | 99 | 52 |
| 6 | 99 | 50 |
| 7 | 98 | 71 |

Reactive Dyeing Of ITC973-Modified Cotton

EXAMPLE 18

The results of the dyeing experiments on the ITC973-modified cotton are summarised in the following TABLE

| | COLOUR STRENGTH | | |
|---|---|---|---|
| Dye | Untreated Cotton | 973-Cotton | Soaped 973-Cotton |
| 1 | 13.7 | 128.5 | 98.7 |
| 2 | 67.0 | 127.8 | 47.7 |
| 3 | 20.0 | 140.4 | 105.6 |

The results obtained from measuring the exhaust dye baths and comparing the colour strength of the soaped cotton samples with the unsoaped modified cotton samples gives the following uptake figures:

| DYE | % EXHAUSTION | % FIXATION |
|---|---|---|
| 1 | 92 | 77 |
| 2 | 93 | 37 |
| 3 | 96 | 75 |

EXAMPLES 19 TO 21

The following examples relate to the effect of treatment, by means of polymeric compositions according to the present invention, of aramid fibres which are subsequently to be included in composites with matrices such as epoxy-resins.

The fibres were treated with a copolynier of VPA and acrylic acid or with a terpolymer of VPA, AA and VSA and the forces required to debond the fibres from the resin matrix were measured The fibres used were those available from Akzo Nobel under the name TWARON 1055 high-modulus fibres. (TWARON is a Registered Trade Mark).

The resin was a two-part, cold-curing epoxy resin comprising 100 parts by weight of LY5052 resin and 38 parts by weight of HY5052 hardener, both available from Ciba-Geigy. The resin contains a rigid novolak base and a low molecular weight reactive diluent, butane-1,4,diol diglycidyl ether. The hardener is a mixture of diamines, including isophorone diamine (35–45%) and 4,4-diamino-3,3'-dimethyl-dicyclohexyl methane (50–60%). The resin was cured at room temperature for 7 days and was found to have a Young's Modulus of about 3 Gpa and a shear yield stress of about 43 Mpa. The results of the "pull-out" tests are given in the TABLE below:

| | Polymer used to treat | COLD-CURE | | HOT-CURE | |
|---|---|---|---|---|---|
| Example | fibre | Tf (c) | Tmax (d) | Tf | Tmax |
| 19 | None (control) | 10 ± 3 | 35.7 ± 4.4 | 6.9 ± 2.7 | 39.7 ± 4.9 |
| 20 | Copolymer (a) | 18 | 28 ± 3.4 | 14.7 ± 3.4 | 36.6 ± 4.2 |
| 21 | Terpolymer (b) | 11.8 ± 2.6 | 23.7 ± 6.2 | 13.3 ± 3.7 | 36.7 ± 5.8 |

Notes:
(a) A copolymer of VPA and AA
(b) A terpolymer of VPA, VSA and AA
(c) Tf = the frictional shear stress in the debonded region of the composite.
(d) Tmax = the maximum shear stress (equivalent to the interfacial shear stress) of the composite.

What is claimed is:

1. A method of treating a fibrous substrate to alter its chemical and/or physical functionality comprising reacting a fibrous substrate with an aqueous solution of a polymeric composition comprising at least one phosphono-component selected from the group consisting of:
   (a) monomeric or homopolymeric vinylidene-1,1-diphosphonic acid;
   (b) homopolymeric vinylphosphonic acid;
   (c) a copolymer of homopolymeric vinylphosphonic acid or homopolymeric vinylidene-1,1-diphosphonic acid, with an unsaturated sulphonic acid, an unsaturated carboxylic acid, an unsaturated amide, a primary amine, a secondary amine or a polyalkylene imine;

(d) a terpolymer of homopolymeric vinylphosphonic acid or homopolymeric vinylidene-1,1-diphosphonic acid, with two components selected from the group consisting of unsaturated sulphonic acids, unsaturated carboxylic acids, unsaturated amides, primary amines, secondary amines and polyalkylene imines; and (e) a reaction product of homopolymeric vinylidene-1,1-diphosphonic acid and a primary amine, a secondary amine, a polyalkylene imine, hypophosphorous acid or a salt of hypophosphorous acid; and (f) a phosphono-substituted monocarboxylic acid or dicarboxylic acid;

and subsequently including said fibrous substrate in a resin matrix.

2. The method according to claim 1, wherein the substrate is in the form of fibers or fabric.

3. The method according to claim 1, wherein the phosphono-component is phosphono-succinic acid.

4. The method according to claim 1, wherein the polymeric composition is a copolymer of homopolymeric vinylphosphonic acid and a compound selected from the group consisting of vinylsulphonic acid, acrylic acid, methacrylic acid and acrylamide.

5. The method according to claim 1, wherein the polymeric composition is a copolymer of homopolymeric vinylidene-1,1-diphosphonic acid and a compound selected from the group consisting of vinylsulphonic acid, acrylic acid, methacrylic acid and acrylamide.

6. The method according to claim 1, wherein the polymeric composition is a terpolymer of homopolymeric vinylidene-1,1-diphosphonic acid, vinylsulphonic acid and a compound selected from the group consisting of acrylic acid, methacrylic acid and acrylamide.

7. The method according to claim 2, wherein the fibers are polyester fibers.

8. The method according to claim 2, wherein the fibers are acrylic fibers or fibers of glass, carbon, poly (p-phenylene benzo bisthiazole) or poly (p-phenylene bisoxazole).

9. The method according to claim 2, wherein the fibers are aliphatic polyamide fibers or aromatic polyamide fibers.

10. The method according to claim 2, wherein the fibers are metal fibers or ceramic fibers.

11. The method according to claim 2, wherein the fibers are cellulosic fibers.

12. The method according to claim 11, wherein the fibers are cotton, wool, ramie, flax or linen.

13. The method according to claim 2, wherein the substrate is said fabric.

14. The method according to claim 13, wherein the fabric is a polyester fabric.

15. The method according to claim 13, wherein the fabric is a cellulosic fabric.

16. The method according to claim 13, wherein the fabric is a non-cellulosic fabric.

17. The method according to claim 13, wherein the fabric is a blend of a cellulosic fabric and a non-cellulosic fabric.

18. The method according to claim 2, wherein the fibers are aramid fibers and the resin is an epoxy resin and the fabric is an aramid fabric and the resin is an epoxy-resin matrix.

* * * * *